(12) United States Patent
Watanabe et al.

(10) Patent No.: US 8,401,320 B2
(45) Date of Patent: Mar. 19, 2013

(54) IMAGE FORMING APPARATUS

(75) Inventors: Mariko Watanabe, Shiojiri (JP); Toshiaki Isobe, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 696 days.

(21) Appl. No.: 12/688,705

(22) Filed: Jan. 15, 2010

(65) Prior Publication Data

US 2010/0182644 A1 Jul. 22, 2010

(30) Foreign Application Priority Data

Jan. 19, 2009 (JP) ................................ 2009-008525

(51) Int. Cl.
*G06K 9/46* (2006.01)
(52) U.S. Cl. ...................................... 382/244
(58) Field of Classification Search .................. 382/232, 382/244
See application file for complete search history.

(56) References Cited

U.S. PATENT DOCUMENTS

| | | | |
|---|---|---|---|
| 6,047,087 A * | 4/2000 | Imaizumi et al. | 382/232 |
| 7,092,965 B2 * | 8/2006 | Easwar | 1/1 |
| 2001/0021223 A1 * | 9/2001 | Andrew | 375/240.11 |
| 2002/0038216 A1 * | 3/2002 | Suzuki | 704/500 |
| 2005/0015247 A1 * | 1/2005 | Sakuyama et al. | 704/229 |
| 2006/0230322 A1 * | 10/2006 | Okazaki | 714/49 |
| 2009/0073282 A1 * | 3/2009 | Yamada et al. | 348/223.1 |

FOREIGN PATENT DOCUMENTS

| JP | 09-216349 A | 8/1997 |
|---|---|---|
| JP | 10-147016 A | 6/1998 |

* cited by examiner

*Primary Examiner* — John Strege
(74) *Attorney, Agent, or Firm* — Kilpatrick Townsend & Stockton LLP

(57) ABSTRACT

An image forming apparatus for compressing image data, includes: a compression unit that reduces data into a predetermined bit number per band of image data so as to satisfy a condition related to a predetermined compression and compresses the reduced data; a specifying unit that specifies a minimum bit number among the predetermined bit numbers applied to the bands and specifies bands which are not compressed by the minimum bit number; and a re-compression unit that performs re-compression on the specified bands so that the data is compressed by the minimum bit number.

5 Claims, 3 Drawing Sheets

IMAGE FORMING APPARATUS

BACKGROUND

1. Technical Field

The present invention relates to an image forming apparatus, and more particularly, to an image forming apparatus having a function of compressing image data for processing.

2. Related Art

An image forming apparatus such as a printer, a copy machine, or a multi-function apparatus compresses image data for processing using a predetermined compression method and stores the compressed data until the processing such as printing is actually started, in order to effectively use resources of a memory, a hard disk, or the like.

Here, the compression process may fail in the case where data after being processed does not satisfy a predetermined condition (for example, a predetermined amount of data, a compression rate, and the like). As a technique for solving this problem, a data processing method is disclosed where the compression method is changed and compression is re-performed from the beginning in the case where compression of one page of image data fails (for example, JP-A-9-216349).

However, in the method disclosed in JP-A-9-216349, first, a compression process is performed on the one page of image data by a lossless compression method. In the case where the compression process fails in the middle of the process, the compression method is changed to a lossy compression method, and the compression process is re-performed on the one page of image data from the beginning. Accordingly, in the case where the compression process fails, the processing time is increased. In addition, since the compression method is changed to the lossy compression method, image quality of the print result is degraded.

Here, in order to suppress an increase in the processing time described above, a method used in the case where the compression process fails where the compression method is changed and the compression process is re-performed from the point where the compression failed. However, when the compression method is changed in the middle of the one page of image data, differences occur in image quality of the one page, and a good print result cannot be obtained.

SUMMARY

An advantage of some aspects of the invention is that it provides a technique for suppressing differences in image quality while continuing a compression process using the same compression method.

According to an aspect of the invention, there is provided an image forming apparatus for compressing image data, including: a compression unit that reduces data into a predetermined bit number per band of image data so as to satisfy a condition related to a predetermined compression and compresses the reduced data; a specifying unit that specifies a minimum bit number among the predetermined bit numbers applied to the bands and specifies bands which are not compressed by the minimum bit number; and a re-compression unit that performs re-compression on the specified bands so that the data is compressed by the minimum bit number.

Here, in the image forming apparatus, the compression unit and the re-compression unit may reduce the bit number of the data by performing a bit shift on each pixel of the image data.

In addition, in the image forming apparatus, the compression unit may continue the compression using the same compression method.

In addition, in the image forming apparatus, the compression method may be a lossless compression method.

According to another aspect of the invention, there is provided an image forming apparatus for compressing image data, including: a compression unit that reduces data into a predetermined bit number per band corresponding to the range, for each range to which each object included in image data belongs, so as to satisfy a condition related to a predetermined compression and compresses the reduced data; a specifying unit that specifies a minimum bit number among the predetermined bit numbers applied to the bands and specifies bands which are not compressed by the minimum bit number; and a re-compression unit that performs re-compression on the specified bands so that the data is compressed by the minimum bit number.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Figure 1:
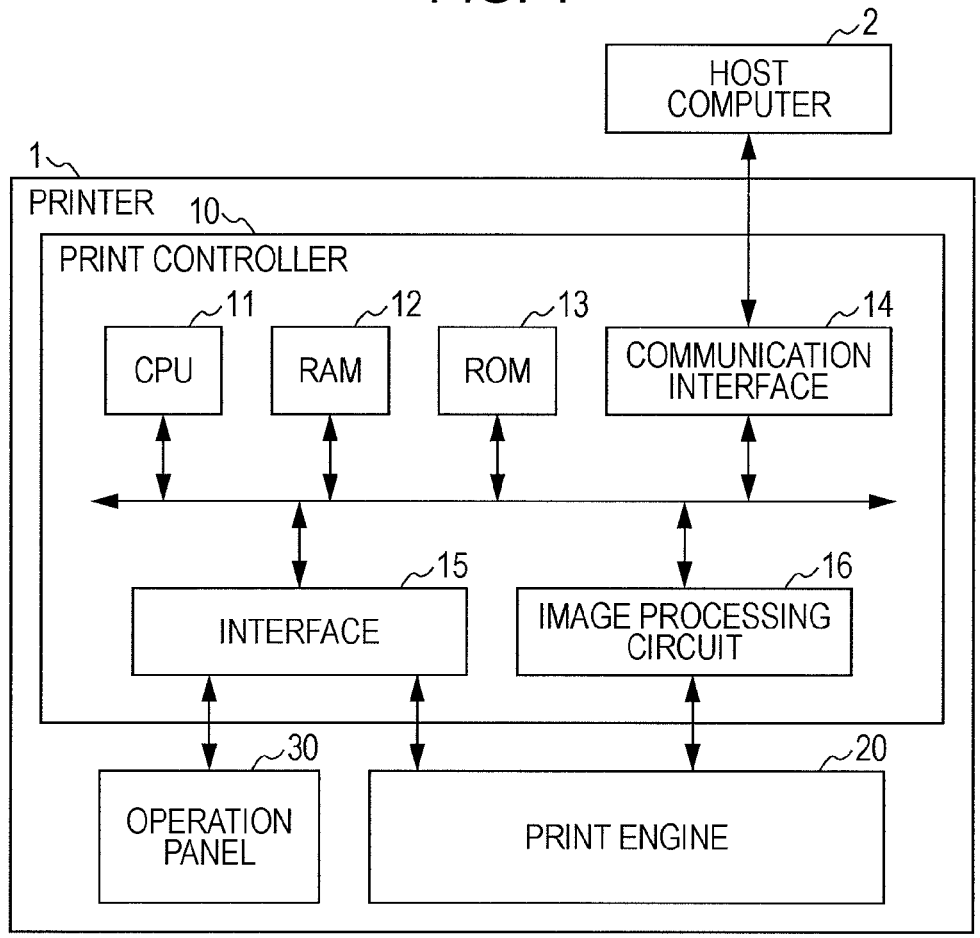
FIG. 1 is a block diagram schematically illustrating the configuration of a printer according to a first embodiment of the invention.

FIG. 1 is a block diagram schematically illustrating the configuration of a printer 1 according to a first embodiment of the invention. The image forming apparatus according to this embodiment is not limited to a printer and may be a copy machine, a multi-function apparatus, or the like.

The printer 1 is a printer for printing on a printing medium such as a printing sheet using a plurality of colors of toner. The printer 1 is connected to a host computer 2 via a network or the like and receives printing data from the host computer 2 to perform printing.

Of course, the printer 1 may be a monochromatic printer using only black toner or may be an ink jet printer.

As illustrated in the figure, the printer 1 includes a print controller 10, a print engine 20, and an operation panel 30.

The print controller 10 is a unit for controlling the entire printer 1. The print controller 10 performs processes of, for example, allowing the print engine 20 to print contents corresponding to the received printing data, displaying on the operation panel 30, and detecting a manipulation of a user in the operation panel 30.

The print controller 10 includes a CPU 11, a RAM 12, a ROM 13, a communication interface 14, an interface 15, an image processing circuit 16, and the like.

The ROM 13 is a non-volatile memory storing various programs, data, and the like. The ROM 13 is, for example, a writable flash ROM. The RAM 12 is a memory for loading the programs, data, and the like stored in the ROM 13. The CPU 11 is an operation circuit for executing various processes by controlling other hardware according to the program loaded on the RAM 12.

The communication interface 14 is a unit configured by circuits for transmission/reception of various data with the host computer 2 or the like. The communication interface 14 performs a process of, for example, transmitting the printing data received from the host computer 2 or the like to the RAM 12 under the control of the CPU 11.

The interface 15 is a unit configured by circuits for transmission/reception of various data between the CPU 11 and the print engine 20 and between the CPU 11 and the operation panel 30. The interface 15 performs processes of, for example, transmitting a control signal to the print engine 20, transmitting data to be displayed, which is stored in the RAM 12, to the operation panel 30, transmitting the data received from the operation panel 30 to the RAM 12, under the control of the CPU 11.

The image processing circuit 16 is a unit for performing various image processing operations. The image processing circuit 16, for example, receives the printing data from the RAM 12 or the communication interface 14, generates the data that is able to be analyzed by the print engine 20 through various image processing operations, and outputs the data to the print engine 20.

The print engine 20 is a unit for printing on a printing medium on the basis of the data received from the print controller 10 under the control of the print controller 10. The print engine 20 includes, for example, a paper cassette, a feed/eject unit for transporting a printing sheet loaded in the paper cassette to a transfer unit, a toner cartridge containing color toners, a photoreceptor unit for forming an electrostatic latent image on a photoreceptor and adhering toner thereto, a transfer unit for transferring the toner image adhered to the photoreceptor to the printing sheet, a fixing unit for fixing the toner image transferred to the printing sheet to the printing sheet, and the like.

The operation panel 30 is an input/output interface between the user and the printer 1 and is a unit provided in a housing of the printer 1. The operation panel 30 includes, for example, a display such as an LCD, a touch panel having transparent property which is adhered to a screen of the LCD, and the like. In addition, various hard switches such as a button key may be provided. The operation panel 30 displays, for example, operation menus and the like under the control of the print controller 10. In addition, the operation panel 30 specifies a touch position corresponding to X-Y coordinates of the displayed image, converts the touch position into coordinates, and outputs the coordinates to the print controller 10.

The configuration of the printer 1 has been schematically described above. However, since the main configuration has been described in order to explain the feature of the embodiment of the invention, the configuration is not limited thereto. In addition, other configurations provided with a general printer are not excluded.

Figure 2:
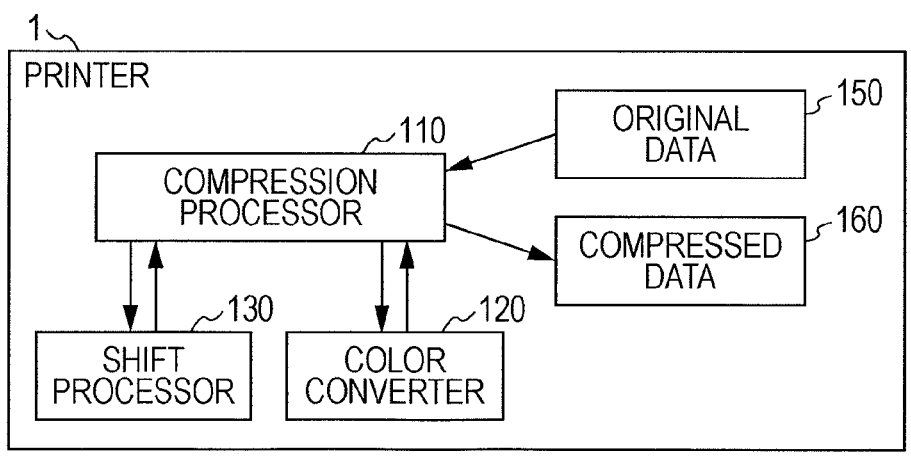
FIG. 2 is a block diagram illustrating the functional configuration related to a compression process of the printer.

Next, the functional configuration related to a compression process of the printer 1 will be described. FIG. 2 is a block diagram illustrating the functional configuration related to the compression process of the printer 1.

As illustrated in the figure, the printer 1 includes a compression processor 110, a color converter 120, and a shift processor 130. In addition, the color converter 120 is representatively provided in order to describe the compression process according to this embodiment, and another form of image processing has not been excluded.

The function portions of the compression processor 110, the color converter 120, and the shift processor 130 are implemented by, for example, executing predetermined programs that the CPU 11 loads on the RAM 12 from the ROM 13. Of course, the function portions may be implemented by the CPU 11 and the image processing circuit 16, or implemented by the image processing circuit 16.

The compression processor 110 compresses the printing data received from the host computer 2 and stores the compressed data in the RAM 12 (FIG. 1) or in a memory (not shown) of the image processing circuit 16 (FIG. 1). The compression processor 110 uses the same compression method without changing the method. In this embodiment, a lossless compression method is used which does not deteriorate image quality when the data is decompressed.

In addition, the printing data to be compressed is, for example, bitmap image data composed of RGB colors. Of course, printing data on a page description language or an intermediate code may be received to be deployed on the bitmap before starting compression.

The compression processor 110 will be described in more detail. The compression processor 110 performs a color conversion process and a bit shift process described later on one page of RGB image data (original data 150) per band divided into a predetermined size, and then performs a compression process thereon. The color conversion process and the shift process are performed by the color converter 120 and the shift processor 130, respectively.

In addition, the compression processor 110 determines whether or not the compression has succeeded per band, and repeatedly performs the color conversion process, the bit shift process, and the compression process until the compression is successful. In addition, in the case where the processes are repeated, a bit shift number used for the bit shift process described later is increased.

In addition, in the case where the compression process is performed on the entire bands constituting one page and completed, the compression processor 110 specifies the maximum bit shift number among the bit shift numbers applied to the entire bands. In addition, in the case where the bit shift number applied to each band is different from the maximum bit shift number, the compressed data of the corresponding band is decompressed, and the bit shift process is performed so that the bit shift number is the maximum bit shift number. That is, the compression process is re-performed.

After performing the compression process as described above, the compression processor 110 outputs the compressed image data (compressed data 160) to the RAM 12 (FIG. 1) or to the memory (not shown) of the image processing circuit 16 (FIG. 1). The compressed data 160 is maintained until a process for printing has actually been started, that is, until the start of generation of data that is able to be analyzed by the print engine 20.

The color converter 120 receives the RGB image data in units of bands output from the compression processor 110, performs the color conversion process thereon, and outputs CMYK image data to the compression processor 110.

The shift processor 130 performs the bit shift process on the CMYK image data in units of bands output from the compression processor 110 and outputs the data to the compression processor 110. Specifically, each piece of image data (for example, 8 bits for each CMYK color) included in the CMYK image data is shifted (right shift) by a specified bit shift number to reduce the amount of data (the number of effective bits).

For example, data of 00111111 (8 bits) is shifted to the right by 2 bits, and the data becomes 001111 (6 bits). In addition, when printing is performed, in order to generate data that is able to be analyzed by the print engine 20, the data needs to be returned to 8-bit data. In this case, for example, by performing left shifts, upper bits are added as lower bits by the shifts. For example, data of 001111 (6 bits) becomes 00111100 (8 bits). Data of 110011 (6 bits) becomes 11001111. Of course, the left shift method is not limited thereto.

In addition, in this embodiment, an amount of the image data is increased/decreased by the bit shift process, however, the embodiment is not limited thereto.

The functional configuration related to the compression process of the printer 1 has been described. In addition, the components are classified according to the main processing contents to enhance understanding of the configuration of the printer 1. Therefore, the embodiment of the invention is not limited by a method of classifying the components and the names of the components. The configuration of the printer 1 may be classified into a greater number of components according to the processing contents. In addition, it may be classified so that one component performs more processing operations.

Figure 3:
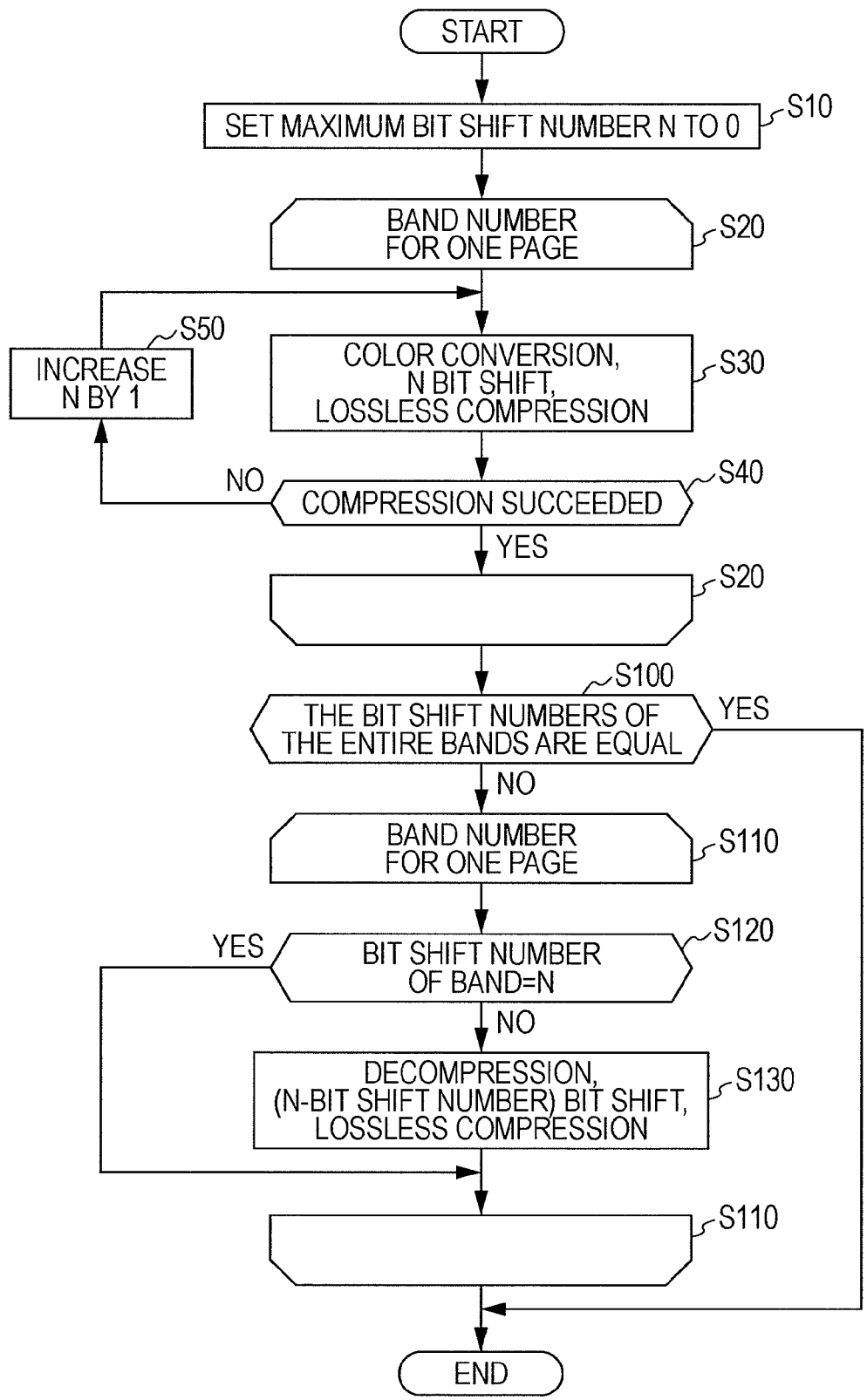
FIG. 3 is a flowchart of the compression process of the printer.

Next, the compression process implemented by the printer 1 will be described. FIG. 3 is a flowchart of the compression process of the printer 1. The figure shows a case where one page of image data is compressed. The flow is started when image data is transmitted to the printer 1.

In Step S10, the compression processor 110 sets the maximum bit shift number N to 0 and then performs a process in Step S20.

In Step S20, the compression processor 110 performs processes of Steps S30, S40, and S50 (in the case of No in Step S40) for each band of the one page of image data. In the case where the processes are performed on the entire bands and completed, a process of Step S100 is performed. In addition, the bands are sequentially processed from the band at one end of the image data to the band at the other end.

In Step S30, the compression processor 110 sequentially performs a color conversion process, a shift process, and a lossless compression process. Specifically, first, the compression processor 110 allows the color converter 120 to perform color conversion on the RGB image data of the bands to be processed. In addition, the compression processor 110 designates the bit shift number to the maximum bit shift number N and allows the shift processor 130 to perform bit shifts on the CMYK image data after being subjected to the color conversion process.

Thereafter, the compression processor 110 performs the compression process using a lossless compression method on the CMYK image data after being subjected to the bit shift process. Then, a process of Step S40 is performed.

In Step S40, the compression processor 110 determines whether or not the compression process has succeeded. Specifically, the compression processor 110 determines whether or not the image data after being subjected to the compression process satisfies a predetermined condition. The predetermined condition is, for example, a compression rate, and in the case where the compression rate of the image data after being subjected to the compression process is greater than a predetermined compression rate, it is determined that the compression has failed.

In the case where the compression process has succeeded (in the case of YES in Step S40), the compression processor 110 performs the process of Step S30 on the bands to be subsequently processed. In addition, when the process is performed on the entire bands and completed, the process of Step S100 is performed. In the case where the compression process has failed (in the case of No in Step S40), the compression processor 110 performs a process of Step S50.

In Step S50, the compression processor 110 increases the maximum bit shift number N by 1 and returns the process to the process of Step S30.

In Step S100, the compression processor 110 determines whether or not the bit shift numbers of the all bands of the one page of the image data are equal to each other. The bit shift number of each band is a bit shift number applied to Step S30 when compression has succeeded (in the case of YES in Step S40). In the case where the bit shift numbers of the all bands are equal to each other (in the case of YES in Step S100), the compression processor 110 ends the flow. In the case where the bit shift numbers of the all bands are not equal to each other (in the case of NO in Step S100), a process of Step S110 is performed.

Figures 4A, 4B:
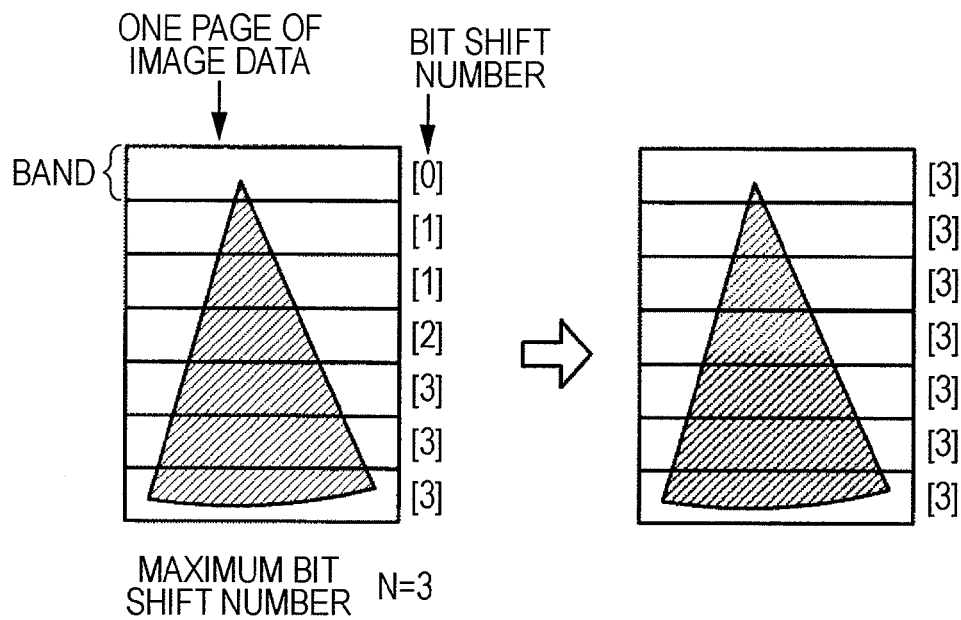
FIGS. 4A and 4B are diagrams for explaining a relationship between image data and a bit shift number.

In addition, after completing the process of Step S20, in the case where the bit shift numbers of the entire bands of the one page of the image data are not equal to each other (in the case of NO in Step S100), for example, as illustrated in FIG. 4A, a bit shift number is applied to each band. In the example of the figure, the bit shift numbers 0, 1, 1, 2, 3, 3, and 3 are applied to the bands in this order from the highest band. In this case, the maximum bit shift number N is 3.

Returning to FIG. 3, the description is continued. In Step S110, the compression processor 110 performs processes of Steps S120 and S130 (in the case of NO in Step S120) on each band of the one page of the image data. When the processes are performed on the entire bands and completed, the flow is terminated. In addition, the bands are sequentially processed from the band at one end of the image data to the band at the other end.

In Step S120, the compression processor 110 determines whether or not the bit shift number of the band to be processed is equal to the maximum bit shift number N. In the case where the bit shift number is equal to N (in the case of YES in Step S120), the determination is performed on the next band to be processed. In addition, when the process is performed on the entire bands and completed, the flow is terminated. On the other hand, in the case where the bit shift number is not equal to N (in the case of NO in Step S120), a process of Step S130 is performed.

In the case where the bit shift number of the band to be processed is equal to N (in the case of YES in Step S120), the flow may be terminated. This is because the bit shift numbers of the bands, which are subsequent to the band having the bit shift number that is equal to N, are equal to N. In this manner, the processes can be omitted.

In Step S130, the compression processor 110 sequentially performs a decompression process, a shift process, and a lossless compression process. Specifically, first, the compression processor 110 performs the decompression process on the image data (Step S20) after being subjected to the compression process of the bands to be processed. Then, the compression processor 110 designates (the maximum bit shift number N-the bit shift number) as a bit shift number, and allows the shift processor 130 to perform bit shifts on the CMYK image data after being subjected to the decompression process.

Thereafter, the compression processor 110 performs the compression process using the same lossless compression method as that of Step S30 on the CMYK image data after being subjected to the bit shift process. Then, the process of Step S120 is performed on the next band to be processed. In addition, when the process is performed on the entire bands and completed, the flow is terminated.

After the process of Step S110 is terminated, for example, the maximum bit shift number N (3) is applied to the entire bands as illustrated by a transition from FIG. 4A to FIG. 4B. That is, the process of Step S130 is performed on the bands (In this example of the figure, bands having bit shift numbers of 0, 1, 1, and 2) having bit shift numbers different from N.

The first embodiment of the invention has been described. According to this embodiment, it is possible to suppress differences in image quality while continuing the compression process using the same compression method.

That is, in this embodiment, the bit shift process for reducing an amount of data and the compression process using the same compression method are repeatedly performed until the compression process is successful for each band. With such a configuration, even in the case where the compression has failed, the same compression method is continuously used, so that differences in image quality can be suppressed. In addition, since the bit shift process is performed, the compressed data can be maintained at an optimal compression rate.

In addition, in this embodiment, after the compression process is performed on the entire bands and completed, the bit shift process and the compression process using the same compression method are re-performed on the bands applying bit shift numbers different from the maximum bit shift number. With such a configuration, image quality of the bands becomes uniform, and differences in image quality are eliminated. Furthermore, the compression rate of the compressed data can be enhanced.

In addition, the embodiment of the invention is intended to exemplify the essence and range of the invention and is not to limit them. It should be understood by the skilled in the art that additions, substitutions, and other modifications can be made.

First Modified Embodiment

For example, an object (for example, a text region and an image region such as graphics) included in one page of image data may be specified to set a maximum bit shift number for each band to which the object belongs.

Specifically, first, the compression processor 110 analyzes the image data received from the host computer 2 and specifies an object. For example, in the case of FIG. 5A, objects A, B, and C are specified.

Figures 5A, 5B:
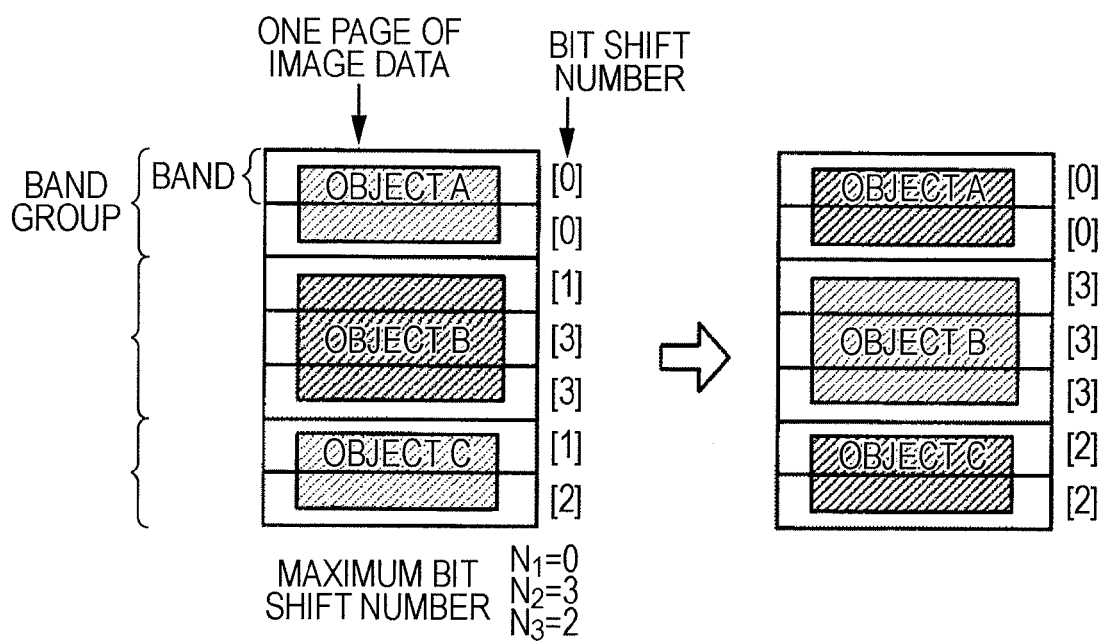
FIGS. 5A and 5B are diagrams for explaining a relationship between image data and a bit shift number in a compression process according to a modified example.

In addition, the compression processor 110 specifies bands to which each of the objects belongs. In the example of FIG. 5A, the object A belongs to the first and second bands from the top. The object B belongs to third to fifth bands. The object C belongs to the sixth and seventh bands.

Thereafter, the compression processor 110 performs the same compression process as that of FIG. 3 on each of the band groups to which the objects belong. That is, each band group is regarded as one page, and the same compression process as that of FIG. 3 is performed.

For example, as illustrated in FIG. 5A, a case is described where a bit shift number is applied to bands constituting each band group. In the example of this figure, bit shift numbers 0 and 0 are applied to the band group to which the object A belongs in this order from the top band. Bit shift numbers 1, 3, and 3 are applied to the band group to which the object B belongs in this order from the top band. Bit shift numbers 1 and 2 are applied to the band group to which the object C belongs in this order from the top band. In this case, the maximum bit shift numbers $N_1$, $N_2$, and $N_3$ of the band groups are $N_1=0$, $N_2=3$, and $N_3=2$, respectively.

Thereafter, in the case where the re-compression process is terminated, as illustrated by a transition from FIG. 5A to FIG. 5B, the maximum bit shift numbers ($N_1=0$, $N_2=3$, and $N_3=2$) of the band groups to which the bands belong are applied to the entire bands constituting the band groups. That is, the process of Step S130 is performed on the band having a bit shift number of 1 in the band group to which the object B belongs. In addition, the process of Step S130 is performed on the band having a bit shift number of 1 in the band group to which the object C belongs.

According to the first modified embodiment, the same maximum bit shift number is not applied to the entire bands constituting one page, but the same maximum bit shift number is applied in units of band groups to which the objects belong. With such a configuration, a bit shift number which is as small as possible is applied to each band, so that data loss due to bit shifts can be reduced. Therefore, data can be reconstructed as close as possible to original image data when printing is performed. In addition, depending on objects, degradation in image quality is suppressed, and visuality is enhanced.

Second Modified Embodiment

For example, for bands in which the bit shift numbers are different from the maximum bit shift number, the bit shift numbers may be changed according to objects that belong to the bands so as to perform re-compression.

Specifically, in Step S130 of FIG. 3, the compression processor 110 specifies an object (for example, a text region and an image region such as graphics) included in the corresponding bands after decompressing the compressed data. In addition, the compression processor 110 designates the determined bit shift number depending on the type of the object and allows the shift processor 130 to perform bit shifts on the CMYK image data after being subjected to the decompression process. The designated bit shift number is, for example, a number obtained by subtracting a predetermined number, which depends on the type of the object, from the maximum bit shift number N so as to be greater than the bit shift number applied in Step S30.

According to the second modified embodiment, in regard to the bands to which the maximum bit shift number is not applied, a bit shift number which is as small as possible is applied depending on objects. With such a configuration, data loss due to the bit shifts is reduced. Therefore, data can be reconstructed as close as possible to the original image data when printing is performed. In addition, depending on objects, degradation in image quality is suppressed, and visuality is enhanced.

The entire disclosure of Japanese Patent Application No. 2009-008525, filed Jan. 19, 2009 is expressly incorporated by reference herein.

What is claimed is:

1. An image forming apparatus for compressing image data, comprising:
   a compression unit that reduces data into a predetermined bit number per band of image data so as to satisfy a condition related to a predetermined compression and compresses the reduced data;
   a specifying unit that specifies a minimum bit number among the predetermined bit numbers applied to the bands and specifies bands which are not compressed by the minimum bit number; and
   a re-compression unit that performs re-compression on the specified bands so that the data is compressed by the minimum bit number.

2. The image forming apparatus according to claim 1, wherein the compression unit and the re-compression unit reduce the bit number of the data by performing a bit shift on each pixel of the image data.

3. The image forming apparatus according to claim 1, wherein the compression unit continues the compression using the same compression method.

4. The image forming apparatus according to claim 3, wherein the compression method is a lossless compression method.

5. An image forming apparatus for compressing image data, comprising:
   a compression unit that reduces data into a predetermined bit number per band corresponding to the range, for each range to which each object included in image data belongs, so as to satisfy a condition related to a predetermined compression and compresses the reduced data;
   a specifying unit that specifies a minimum bit number among the predetermined bit numbers applied to the bands and specifies bands which are not compressed by the minimum bit number; and
   a re-compression unit that performs re-compression on the specified bands so that the data is compressed by the minimum bit number.

* * * * *